US 8,974,340 B2

(12) United States Patent
Chung et al.

(10) Patent No.: US 8,974,340 B2
(45) Date of Patent: Mar. 10, 2015

(54) HYBRID MECHANISM AND HYBRID MODE THEREOF

(71) Applicant: Industrial Technology Research Institute, HsinChu (TW)

(72) Inventors: Yun-Jui Chung, Hsinchu (TW); Ching-Huei Wu, Hsinchu (TW); Sheng-Feng Tsai, Hsinchu (TW)

(73) Assignee: Industrial Technology Research Institute, Hsinchu County (TW)

( * ) Notice: Subject to any disclaimer, the term of this patent is extended or adjusted under 35 U.S.C. 154(b) by 0 days.

(21) Appl. No.: 14/096,080

(22) Filed: Dec. 4, 2013

(65) Prior Publication Data

US 2014/0228160 A1 Aug. 14, 2014

Related U.S. Application Data

(60) Provisional application No. 61/762,577, filed on Feb. 8, 2013.

(30) Foreign Application Priority Data

Jun. 24, 2013 (TW) .............................. 102122343 A

(51) Int. Cl.
*F16H 3/72* (2006.01)
*F16H 37/06* (2006.01)
*B60K 6/50* (2007.10)

(52) U.S. Cl.
CPC ................ *B60K 6/50* (2013.01); *Y10S 903/945* (2013.01)
USPC .................... 475/5; 475/151; 475/248; 477/5; 903/945

(58) Field of Classification Search
CPC .................... F16H 2048/343; F16H 2048/106; F16H 48/10; B60K 6/365; B60K 6/445; B60W 10/02

USPC ............. 475/5, 150, 151, 199, 201, 248, 339, 475/343; 477/5
See application file for complete search history.

(56) References Cited

U.S. PATENT DOCUMENTS 3,566,717 A * 3/1971 Berman et al. ...................... 77/3
3,580,107 A * 5/1971 Orshansky, Jr. ................. 475/78

(Continued)

FOREIGN PATENT DOCUMENTS

TW         431977 B    5/2001
TW         I337141 B   2/2011

OTHER PUBLICATIONS

On the Study of the Applicability of Hybrid Motorcycles with a single centrifugal clutch; Wang Fang-Hsien; Department of Mechanical Engineering, College of Engineering; Jul. 2011, 146 pages.

(Continued)

*Primary Examiner* — Justin Holmes
*Assistant Examiner* — Tinh Dang
(74) *Attorney, Agent, or Firm* — Rabin & Berdo, P.C.

(57) ABSTRACT

A hybrid mechanism is provided, including: an engine, a first motor, a second motor, a clutch, a hybrid unit, a differential, and a battery. The clutch, the second motor and the engine are sequentially coupled to one end of the hybrid unit, and the first motor and the battery are coupled to the other end of the hybrid mechanism. The battery provides supplying currents to the first motor or the second motor or receives range-extend currents from the second motor. The hybrid unit includes a first sun gear, a second sun gear, at least one planetary gear coupled to the first and second sun gears, and a planet carrier coupled to the at least one planetary gear. The hybrid mechanism has four modes. The hybrid unit harmonizes the first driving force from the first motor and the engine and the second driving force from the second motor and outputs a harmonized driving force to the differential.

19 Claims, 5 Drawing Sheets

(56) References Cited

U.S. PATENT DOCUMENTS

| | | | |
|---|---|---|---|
| 3,744,344 A * | 7/1973 | Olsen et al. ................ 475/79 |
| 5,735,770 A * | 4/1998 | Omote et al. .................. 477/5 |
| 5,947,855 A | 9/1999 | Weiss |
| 6,053,833 A * | 4/2000 | Masaki ........................ 475/2 |
| 6,144,403 A | 11/2000 | Otani |
| 6,155,364 A | 12/2000 | Nagano et al. |
| 6,253,865 B1 | 7/2001 | Suzuki |
| 6,371,878 B1 * | 4/2002 | Bowen ......................... 475/5 |
| 6,833,646 B2 | 12/2004 | Joong et al. |
| 6,845,305 B1 | 1/2005 | Raftari et al. |
| 7,192,373 B2 * | 3/2007 | Bucknor et al. ................ 475/5 |
| 7,237,634 B2 | 7/2007 | Severinsky et al. |
| 7,240,748 B2 | 7/2007 | Kira et al. |
| 7,465,251 B2 * | 12/2008 | Zhang ........................... 477/5 |
| 7,609,011 B2 * | 10/2009 | Yatabe et al. .................. 318/140 |
| 8,287,412 B2 * | 10/2012 | Lee et al. ...................... 475/5 |
| 2002/0061802 A1 | 5/2002 | Chung |
| 2002/0065165 A1 * | 5/2002 | Lasson et al. .................. 477/3 |
| 2008/0242498 A1 * | 10/2008 | Miller et al. .................. 477/5 |
| 2008/0243325 A1 * | 10/2008 | Kozarekar et al. ............. 701/22 |
| 2010/0120580 A1 | 5/2010 | Mepham et al. |
| 2010/0273596 A1 * | 10/2010 | Seo et al. ...................... 475/5 |
| 2012/0217121 A1 | 8/2012 | Noda et al. |

OTHER PUBLICATIONS

An exploratory study of why car users resist the innovation of Hybrid Electric Vehicle; Oct. 2010, 185 pages.
A Reliability Study on the Power System of Hybrid Electronics Vehicles; Chang-Pin Lin, Yu-Tun Huang; Jul. 2009, 77 pages.
Fuel-Electric Hybrid Systems Composed of Mechanical Clutching Units for Scooters; I-Min Chen; Jun. 2009, 139 page.
On the Study of Systems Matching and Evaluation for Hybrid Vehicles; Ying-Hsiu Chen; Jul. 2009, 142 page.
The Conceptual Design Method of Hybrid Power System; Cheng-Shun Jiang; Jul. 2008, 166 page.
The development and Evaluation of the concepts for Hybrid Vehicles; Pei-Tsung Kuo; Jul. 2009, 148 page.

* cited by examiner

HYBRID MECHANISM AND HYBRID MODE THEREOF

CROSS-REFERENCE TO RELATED APPLICATIONS

This application claims priority to a provisional application No. 61/762,577 filed Feb. 8, 2013 and Taiwanese Patent Application No. 102122343, filed on Jun. 24, 2013. The entirety of the provisional application and above-mentioned patent application is hereby incorporated by reference herein and made a part of this specification.

BACKGROUND

1. Technical Field

The present disclosure relates to apparatuses using a hybrid mechanism, and, more particularly, to a hybrid mechanism that provides hybrid power to an engine and a motor and a hybrid mode thereof.

2. Description of Related Art

In recent years, as the power resources gradually decline and the demands for green energy increase, hybrid vehicles have been steadily gaining in popularity. Many manufacturers have been actively involving in hybrid mechanism research, in hope to design hybrid vehicles that can reduce fuel usage, and are energy efficient while retaining sufficient horsepower.

Conventional hybrid mechanisms require coupling the engine to a plurality of motors using a clutch. However, it is difficult to control and adjust the transmitted power using this type of power transmission mode. Besides, the hybrid mechanism technology has not yet invented an effective coupling method using a planetary gear to couple the engine with the motors to reach the goal of hybrid mechanism. Since the foregoing planetary gear contains an internal gear which requires high precision in manufacturing, and planetary gear is often too large, there are obstacles and challenges awaited.

Therefore, there is a need for developing a hybrid mechanism that allows easy adjustment of power transmission between the engine and the plurality of motors, which can be used in a hybrid vehicle, and in addition to meet the requirement of small size and simplified manufacturing procedure.

SUMMARY

The present disclosure provides a hybrid mechanism to transmit power between the engine and motors in hybrid vehicles. The hybrid mechanism comprises: an all electric mode, in which all power is provided by the batter; an electric range-extend mode, in which the engine provides and transmits power to a motor to provide currents to a battery, and the battery provides currents to another motor; an engine/motor hybrid mode, in which the power of the engine is mixed with the power of the motor; and a double motor mode, in which the battery provides currents to the two motors to output power.

The present disclosure further discloses a hybrid mechanism, comprising: an engine; a hybrid unit comprising a planet carrier, a first sun gear, a second sun gear, and at least one planetary gear, wherein the first sun gear, the second sun gear and at least one planetary gear are mounted in the planet carrier, allowing the planet carrier to be coupled to the at least one planetary gear and the at least one planetary gear to be coupled to the first sun gear and the second sun gear, and the first sun gear and the second sun gear share a same pivot point and are not engaged directly; a first motor coupled to the first sun gear; a second motor coupled to the engine; a first clutch coupled to the second motor; a second clutch sharing a same pivot point with the first clutch and coupled to the planet carrier; a differential coupled to the second sun gear; and a battery mounted to the first motor and the second motor for providing supply currents to the first motor or the second motor or receiving additional currents from the second motor.

In addition, the present disclosure discloses a hybrid mechanism mode, providing a variety of power modes through a combination of a battery, a first motor, a second motor and an engine, the hybrid mechanism mode comprising: an all electric mode, in which the battery provides supplying currents to the first motor to output power; an electric range-extend mode, in which the engine provides power to the second motor to provide range-extend currents to the battery, and the battery provides the supplying currents to the first motor to output power; and an engine/motor hybrid mode, in which power of the engine and power of the first motor are combined to output power.

In an embodiment, when the hybrid mechanism is in the is operating in the all electric mode, a brake unit enables the engine and the second motor to stop providing power, and the battery provides the supplying currents to the first motor, allowing the first motor to output a first driving force to the hybrid unit, and the first driving force is transmitted from the first sun gear through the second sun gear to the differential.

In another embodiment, when the hybrid mechanism is operating in the electric range-extend mode, a brake unit locks a gear, allowing the planet carrier that is coupled to the gear not to rotate, the coupling of the first clutch allows the engine to drive the second motor to act as a power generator and provide the additional currents the battery, the battery provides the supplying currents to the first motor, allowing the first motor to output a first driving force to the hybrid unit, and the first driving force is transmitted from the first sun gear through the second sun gear to the differential.

In further another embodiment, when the hybrid mechanism is operating in the engine/motor hybrid mode, the battery provides the supplying currents to the first motor, the first motor outputs first driving power to the hybrid unit, the first driving force is transmitted from the first sun gear to the second sun gear, the first clutch is coupled with the second clutch to enable the engine to output a second driving force to the hybrid unit, the second driving force is transmitted from the planet carrier to the planetary gear, and the hybrid unit receives and harmonizes the first driving force and the second driving force and outputs a harmonized driving force from the second sun gear to the differential.

In yet another embodiment, when the hybrid mechanism is operating in the double motor mode, the battery provides the supply power to the first motor and the second motor, the first motor outputs a first driving force to the hybrid unit, the first driving force is transmitted from the first sun gear to the second sun gear, allowing the second clutch to be coupled and prevent from powering up the engine, the second engine outputs a second driving force to hybrid unit, the second driving force is transmitted from the planet carrier to the planetary gear, the hybrid unit receives and harmonizes the first driving force and the second driving force and outputs a harmonized driving force from the second sun gear to the differential.

The present disclosure further discloses a hybrid mechanism, comprising: an engine; a hybrid unit comprising a planet carrier, a first sun gear, a second sun gear, and at least one planetary gear, wherein the first sun gear, the second sun gear and at least one planetary gear are mounted in the planet carrier, allowing the planet carrier to be coupled to the at least one planetary gear and the at least one planetary gear to be coupled to the first sun gear and the second sun gear, and the first sun gear and the second sun gear share a same pivot point and are not engaged directly; a clutch having one end coupled to the engine and the other end coupled to the planet carrier for inputting power to the hybrid unit; and a differential coupled to the second sun gear through a pair of gears for transmitting power of the hybrid unit to the differential.

DETAILED DESCRIPTION

Figure 1:
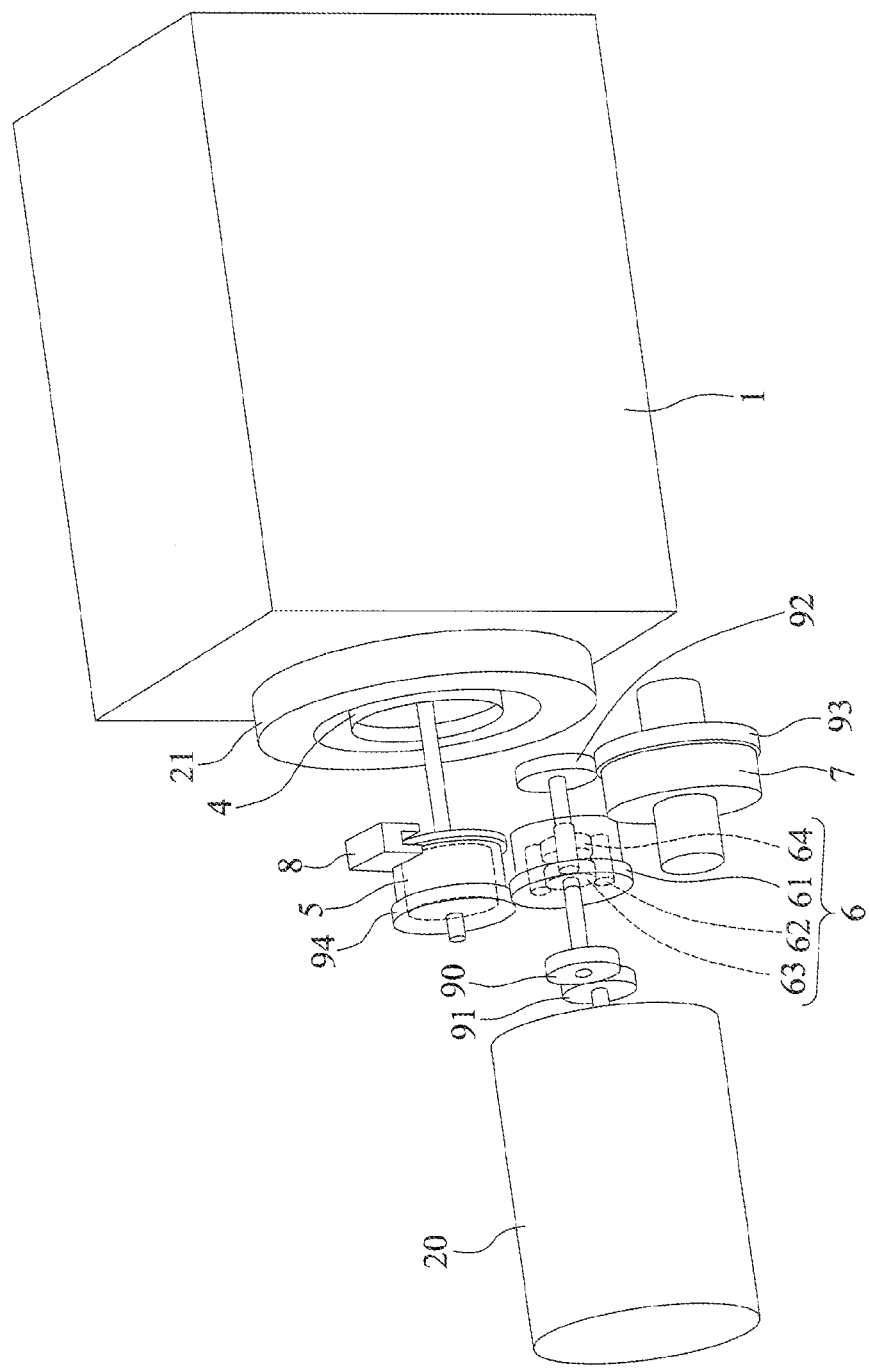
FIG. 1 is a schematic view of a hybrid mechanism in accordance with a first embodiment of the present disclosure.

In the following detailed description, for purposes of explanation, numerous specific details are set forth in order to provide a through understanding of the disclosed embodiments. It will be apparent, however, that one or more embodiments may be practiced without these specific details. In other instances, well-known structures and devices are schematically shown in order to simplify the drawing.

Referring to FIG. 1, a hybrid mechanism 100 of a first embodiment according to the present disclosure is shown. The hybrid mechanism 100 comprises an engine 1, a first motor 20, a second motor 21, a first clutch 4, a second clutch 5, a hybrid unit 6, and a differential 7. The hybrid mechanism 100 is mounted on a vehicle, for providing hybrid power to drive the engine and the motors to power the vehicle.

Figure 2:
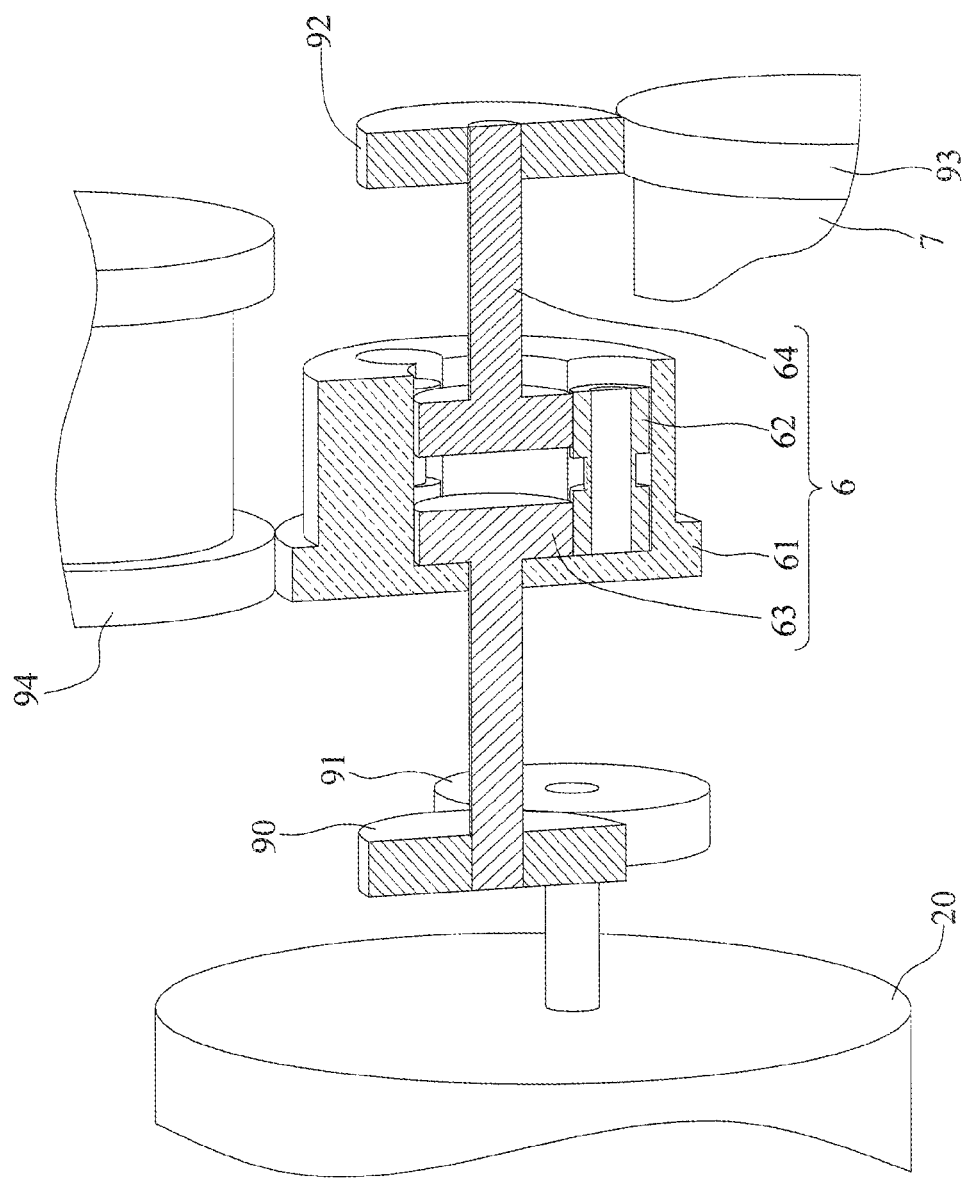
FIG. 2 is a cross-sectional view of a hybrid unit of a hybrid mechanism according to the present disclosure.

The present disclosure discloses a design incorporating a hybrid mechanism, using two sun gears, one planetary gear and one planet carrier. FIGS. 1 and 2 illustrate the hybrid unit 6. FIG. 2 shows a cross-sectional view of the hybrid unit 6 in the hybrid mechanism 100.

The hybrid unit 6 comprises a planet carrier 61, at least one planetary gear 62, a first sun gear 63 and a second sun gear 64. In an embodiment, the first sun gear 63, the second sun gear 64 and the at least one planetary gear 62 are mounted in the planet carrier 61, the planet carrier 61 is coupled with the at least one planetary gear 62, the at least one planetary gear 62 is coupled to the first sun gear 63 and the second sun gear 64, and the first sun gear 63 and the second sun gear 64 have the same pivot point and are not engaged directly.

Besides, the first motor 20 is coupled to the first sun gear 63, and the second motor 21 is coupled to the engine 1. The first clutch 4 is coupled to the second motor 21, and the second clutch 5 is coupled to the first clutch 4 at the same pivot point and is coupled to the planet carrier 61. The differential 7 is coupled to the second sun gear 64. The first motor 20 and the second motor 21 are coupled to a battery (not shown), which provides supplying currents to the first motor 20 or the second motor 21, or receives from the second motor 21 range-extend currents that are generated by the engine 1.

Since the first sun gear 63 is connected to the first motor 20 and the planet carrier 61 is connected to the engine 1 and the second motor 21, internal components of the hybrid unit 6 can receive power transmitted from the engine 1, the first motor 20 and the second motor 21, alone or in combination.

If the driving forces come from a single source, there is no need for the hybrid unit 6 to harmonize various power sources. Therefore, the driving force can be directly output from the second sun gear 64, allowing the differential 7 to change or adjust output speed. If the driving forces come from two sources, the hybrid unit 6, after receiving the driving forces, harmonizes the driving forces. In specific, the planet carrier 61, the planetary gear 62, the first sun gear 63 and the second sun gear 64 harmonize the driving forces and generate a harmonized driving force, which will be output by the second sun gear 64, allowing the differential 7 to change or adjust the output speed.

It should be noted that any number of the planetary gear 62 can be included in the hybrid unit 6, and the hybrid unit 6 can still operate normally even if only one planetary gear 62 is included therein. While three planetary gears 62 are shown in FIG. 1 and two planetary gears 62 are shown in FIG. 2, the number of the planetary gears 62 is adjustable and the foregoing description is to show the first embodiment of the disclosure.

In an embodiment, the hybrid mechanism 100 further comprises a brake unit 8 coupled to the second clutch 5. The brake unit 8 locks the second clutch 5 to prevent the planet carrier 61 from rotating under certain circumstances.

In an embodiment, the hybrid mechanism 100 optionally comprises a first gear 90, a second gear 91, a third gear 93, a fourth gear 93 and a fifth gear 94. The first gear 90 is coupled with the first sun gear 63 using the same pivot point, while the second gear 91 is coupled with the first motor 20 using the same pivot point, such that the first gear 90 is engaged with the second gear 91. A driving force, when generated from the first motor 20, is transmitted through the movement of the first gear 90 and second gear 91 to the first sun gear 63.

The third gear 92 and the second sun gear 64 are coupled through the same pivot point, and the fourth gear 93 is coupled to the periphery of the fourth gear 93 where the third gear 92 is engaged with the fourth gear 93 in such a way that after the driving force generated from the second sun gear 64 is transmitted through the third gear 92 and the fourth gear 93 to the differential 7.

The clutch 5 is coupled to the fifth gear 94, and the fifth gear 94 is engaged with the planet carrier 61, such that the driving force transmitted from the engine 1 or the second motor 21 through the fifth gear 94 drives the planet carrier 61.

The first gear 90, the second gear 91, the third gear 92, the fourth gear 93 and the fifth gear 94 are not essential components, which can be omitted according to practical requirement.

In summary, the hybrid mechanism according to the present disclosure can be achieved through the coupling of the sun gear with the planet carrier, and allow selective adjustment of the driving force provided by motors or the engine, which can be used in hybrid vehicles with the advantage of being smaller in size. The hybrid mechanism has four different hybrid modes, which are described in more details in the following paragraphs.

Figure 3:
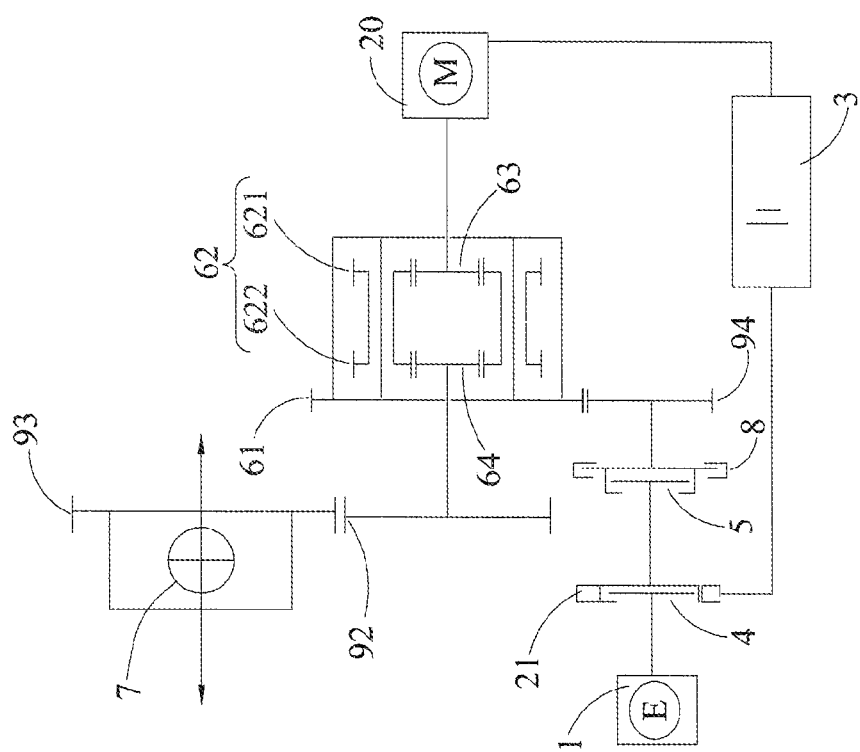
FIG. 3 is a schematic view of a hybrid mechanism according to the present disclosure.

FIG. 3 is provided to show the power transmission or electricity flow in the hybrid mechanism 100. FIG. 3 is the plenary view of FIG. 1, which should both be referred to in understanding the hybrid mechanism.

As shown in FIG. 3, the engine 1 is coupled to the to the planet carrier 61 through the second motor 21 that is coupled to the first clutch 4 and the second clutch 5 that is coupled to the brake unit 8. The first motor 20 is coupled to the first sun gear 63. The battery can provide currents to the first motor 20 and the second motor 21, or to the first motor 20 only, so as to provide different driving forces. In addition, the battery 3 can also receive and store currents generated by the second motor 21.

The hybrid unit 6 comprises a planet carrier 61, a planetary gear 62, a first sun gear 63 and a second sun gear 64. The planetary gear 62 is coupled to the peripheries of the first sun gear 63 and the second sun gear 64, and the planet carrier 61 is coupled to the planetary gear 62. The first sun gear 63 receives a driving force from the first motor 20, and the planet carrier 61 receives another driving force from the engine 1 and the second motor 21. Through harmonizing the two driving forces in the hybrid unit 6, a harmonized driving force is transmitted to the differential 7. It should be noted that though two planetary gears 62 are shown, the number of planetary gears 62 is not limited to two.

The third gear 92 and the fourth gear 93 provide a connection relation between the differential 7 and the second sun gear 64. The fifth gear 94 provides a connection relation between the second clutch 5 and the planet carrier 61.

In an embodiment, the planetary gear 62 further comprises a first terminal 621 engaged with the first sun gear 63, and a second terminal 622 engaged with the second sun gear 64. The first terminal 621 and the second terminal 622 have different numbers of teeth, to achieve different ratio adjustment. The first terminal 621 and the second terminal 622 of the planetary gear 62 correspond to that the number of teeth of the first sun gear 63 and the second sun gear 64, respectively.

In the foregoing structure, a teeth number $Z_A$ of the output second sun gear is greater than a teeth number $Z_D$ of the input sun gear, allowing a gear ratio $i_0 = Z_B Z_D / Z_A Z_C$ to fall between 0 and 1. $Z_B$ and $Z_C$ correspond to the numbers of teeth of the second sun gear and first sun gear, respectively.

Based on the foregoing design, when the power is generated solely by the first motor, the rotational speed of the planet carrier is kept constant and power is transmitted from the first gear (at a rotational speed $\omega 1$) to the second sun gear (at a rotational speed $\omega 2$), resulting in same directional speed reduction and the ratio of speed is $\omega 2 / \omega 1 = i_0$.

When the power is generated by both the engine and motor, the power is transmitted from the first sun gear (at a rotational speed $\omega 1$), and the planet carrier (at a rotational speed $\omega s$), to the second sun gear (at a rotational speed $\omega 2$), and the output speed is $\omega 2 = i_0 \omega 2 + (1 - i_0) \omega s$. The output torque of the second sun gear equals to the total torque from the first sun gear and the planet carrier, thereby achieving the result of hybrid power.

Based on the hybrid mechanism illustrated in FIGS. 1-3, there are four different modes, depending on whether the battery or the engine is used to provide the power so as to adjust the rotational speed of the differential.

Figure 4A:
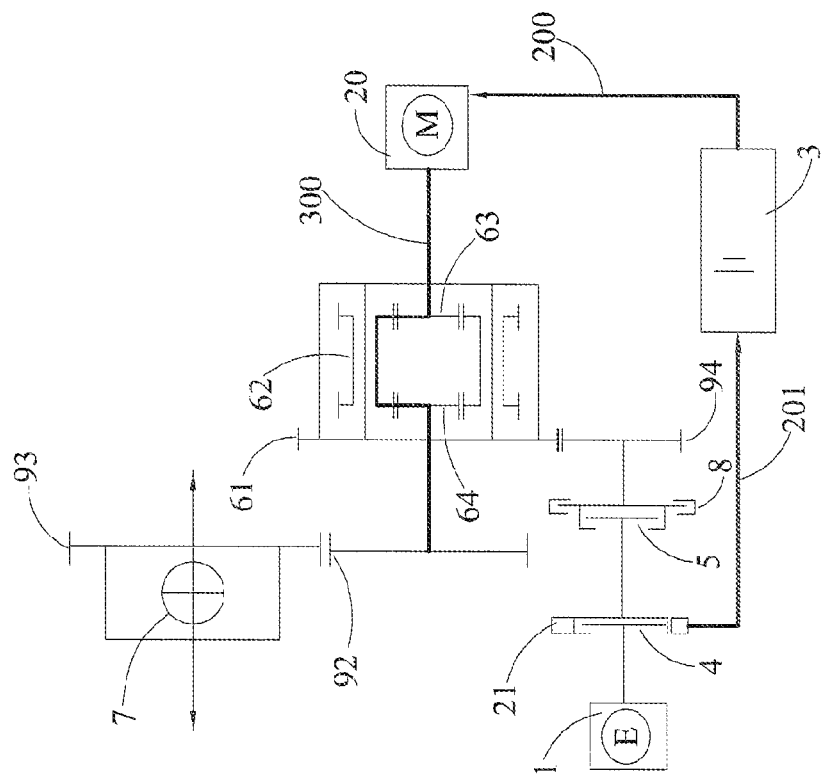
FIG. 4A is a schematic view illustrating the operation of a first hybrid mode of a hybrid mechanism according to the present disclosure.

Referring to FIG. 4A, the first hybrid mode of the hybrid mechanism according to the present disclosure is shown. The first mode is an all electric mode, in which both the engine 1 and the second motor 21 will not provide power, and the power is solely provided by the battery 3 and transmitted to the first motor 20. As shown in FIG. 4A, the brake unit 8 locks the fifth gear 94, preventing the planet carrier 61 engaged with the fifth gear 94 from rotation, such that the engine 1 and the second motor 21 cannot provide power. Instead, the battery 3 provides the supplying currents 200 to the first motor, allowing the first driving force 300 to be transmitted from the first motor 20 to the first sun gear 63 of the hybrid unit, and transmitted through the third gear 92 and fourth gear 93 to the differential 7. As illustrated, the first mode is an electric driving mode, which is suitable for vehicles traveling on normal road.

Figure 4B:
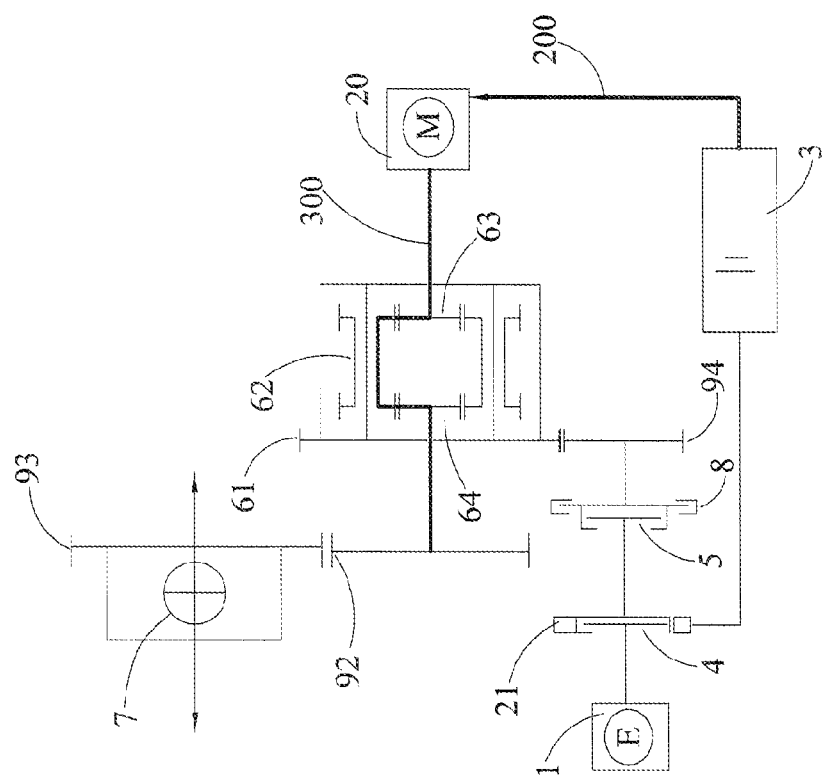
FIG. 4B is a schematic view illustrating the operation of a second hybrid mode of a hybrid mechanism according to the present disclosure.

Referring to FIG. 4B, the second hybrid mode of the hybrid mechanism according to the present disclosure is shown. The second mode is an electric range-extend mode, in which both the engine 1 and the second motor 21 will not provide the power, and the battery 3 generates power to the first motor 20. The engine 1 is capable of powering up the second motor 21 as a power generator to output range-extend currents 201 to the battery 3. As shown in FIG. 4B, the brake unit 8 locks the fifth gear 94, preventing the planet carrier 61 engaged with the fifth gear 94 from rotation. The clutch 4 is engaged to drive the engine 1 to power the second motor 21 as a power generator so as to output range-extend currents 201 to the battery 3, for recharging the battery 3. Besides, the battery 3 provides the supplying currents 200 to the first motor 20, allowing the first driving force 300 to be transmitted from the first motor 20, to the first sun gear 63 of the hybrid unit, and through the third gear 92 and fourth gear 93 to the differential 7. As illustrated, the second mode is also an electric driving mode, which is suitable for vehicles traveling on normal road with longer mileage requirement.

Figure 4C:
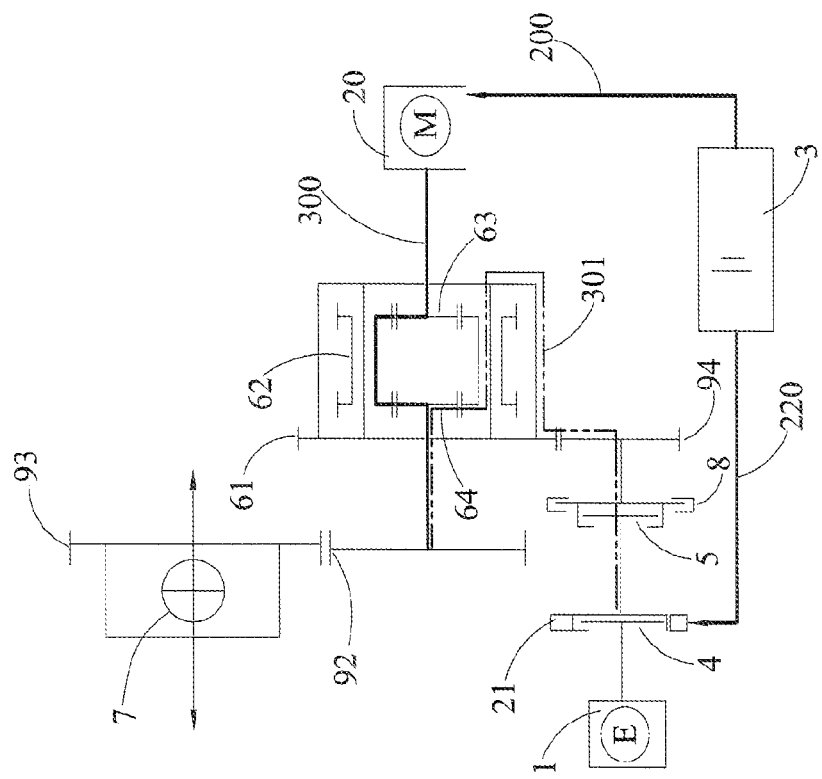
FIG. 4C is a schematic view illustrating the operation of a third hybrid mode of a hybrid mechanism according to the present disclosure.

Referring to FIG. 4C, the third hybrid mode of the hybrid mechanism according to the present disclosure is shown. The third mode is an engine/motor hybrid mode, in which the power is provided by both the engine 1 and the first motor 20. The power source of the first motor 20 is provided by the battery 3. As shown in FIG. 4C, the battery 3 provides the supplying currents 200 to the first motor 20, allowing the first driving force 300 from the first motor 20 to be transmitted to the first sun gear 63, and the first clutch 4 and the second clutch 5 to be engaged. When the engine 1 is powered, the second driving force 301 is transmitted through the fifth gear 94 to move the planet carrier 61 and then the planetary gear 62. Meanwhile, the hybrid unit 6 harmonizes the first driving force 300 and the second driving force 301, to output a harmonized driving force from the second sun gear 64, through the third gear 92 and the fourth gear 93 and transmitted to the differential 7. As illustrated, the third mode is an engine and electricity powered mode, which is able to provide the maximum power output, which is suitable for vehicles traveling uphill or accelerating.

Figure 4D:
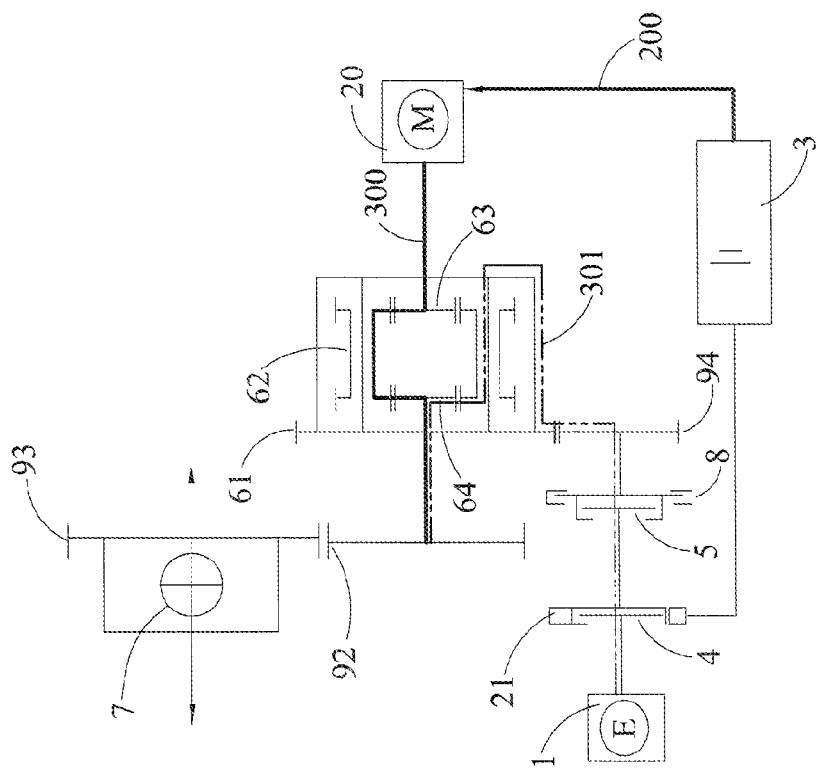
FIG. 4D is a schematic view illustrating the operation of a fourth hybrid mode of a hybrid mechanism according to the present disclosure.

Referring to FIG. 4D, the forth hybrid mode of the hybrid mechanism according to the present disclosure is shown. The fourth mode is a double motor mode, in which the power is provided by the first motor 20 and the second motor 21 which is powered by the battery 3. As shown in FIG. 4D, the battery 3 provides the supplying currents 200 to the first motor, allowing the first driving force 300 from the first motor 20 to be transmitted to the first sun gear 63, and the engagement of the clutch 5 prevents powering up the engine 1. The battery 3 also provides the supplying currents 220 to the second motor 21, allowing the second driving force 301 to be transmitted to the planet carrier 61 through the rotation of fifth gear 94, and subsequently move the planetary gear 62. Meanwhile, the hybrid unit 6 harmonizes the first driving force 300 and the second driving force 301, to output a harmonized driving force from the second sun gear 64, to the differential 7. As illustrated, the fourth mode is an all electric boost powered mode, which is able to provide the electric power output, which is suitable for vehicles traveling on normal roads.

In summary, the hybrid mechanism according to the present disclosure uses two sun gears, a plurality of planetary gears and planet carrier to combine power from both the engine and motors in order to make adjustments of the transmission power, allowing the hybrid vehicle to have four different hybrid modes.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A hybrid mechanism, comprising:
an engine;
a hybrid unit comprising a planet carrier, a first sun gear, a second sun gear, and at least one planetary gear, wherein the first sun gear, the second sun gear and at least one planetary gear are mounted in the planet carrier, allowing the planet carrier to be directly coupled to the at least one planetary gear and the at least one planetary gear to be directly coupled to the first sun gear and the second sun gear, and the first sun gear and the second sun gear share a same pivot point and are not engaged directly;
a first motor coupled to the first sun gear;
a second motor coupled to the engine;
a first clutch coupled to the second motor;
a second clutch sharing a same pivot point with the first clutch and directly coupled to the planet carrier;
a differential coupled to the second sun gear;
a battery mounted to the first motor and the second motor for providing supply currents to the first motor or the second motor or receiving additional currents from the second motor; and
a fifth gear directly coupled to the second clutch and engaged with the planet carrier.

2. The hybrid mechanism of claim 1, further comprising a brake unit directly coupled to the second clutch.

3. The hybrid mechanism of claim 1, further comprising a first gear and a second gear, wherein the first sun gear is directly coupled to the first gear at the same pivot point, and a rotating shaft of the first motor is directly coupled to the second gear at the same pivot point, and the first gear is engaged with the second gear.

4. The hybrid mechanism of claim 1, further comprising a third gear and a fourth gear, wherein the second sun gear is directly coupled to the third gear at the same pivot point, the fourth gear is directly coupled to the differential, and the fourth gear is engaged with the third gear.

5. The hybrid mechanism of claim 1, wherein when the hybrid mechanism is operating in an all electric mode, a brake unit enables the engine and the second motor to stop providing power, and the battery provides the supplying currents to the first motor, allowing the first motor to output a first driving force to the hybrid unit, and the first driving force is transmitted from the first sun gear through the second sun gear to the differential.

6. A hybrid mechanism, comprising:
an engine;
a hybrid unit comprising a planet carrier, a first sun gear, a second sun gear, and at least one planetary gear, wherein the first sun gear, the second sun gear and at least one planetary gear are mounted in the planet carrier, allowing the planet carrier to be directly coupled to the at least one planetary gear and the at least one planetary gear to be directly coupled to the first sun gear and the second sun gear, and the first sun gear and the second sun gear share a same pivot point and are not engaged directly;
a first motor coupled to the first sun gear;
a second motor coupled to the engine;
a first clutch coupled to the second motor;
a second clutch sharing a same pivot point with the first clutch and directly coupled to the planet carrier;
a differential coupled to the second sun gear; and
a battery mounted to the first motor and the second motor for providing supply currents to the first motor or the second motor or receiving additional currents from the second motor,
wherein when the hybrid mechanism is operating in an electric range-extend mode, a brake unit locks a gear, allowing the planet carrier that is directly coupled to the gear not to rotate, the coupling of the first clutch allows the engine to drive the second motor to act as a power generator and provide the additional currents to the battery, the battery provides the supplying currents to the first motor, allowing the first motor to output a first driving force to the hybrid unit, and the first driving force is transmitted from the first sun gear through the second sun gear to the differential.

7. The hybrid mechanism of claim 1, wherein when the hybrid mechanism is operating in an engine/motor hybrid mode, the battery provides the supplying currents to the first motor, the first motor outputs first driving power to the hybrid unit, the first driving force is transmitted from the first sun gear to the second sun gear, the first clutch is directly coupled with the second clutch to enable the engine to output a second driving force to the hybrid unit, the second driving force is transmitted from the planet carrier to the planetary gear, and the hybrid unit receives and harmonizes the first driving force and the second driving force and outputs a harmonized driving force from the second sun gear to the differential.

8. A hybrid mechanism, comprising:
an engine;
a hybrid unit comprising a planet carrier, a first sun gear, a second sun gear, and at least one planetary gear, wherein the first sun gear, the second sun gear and at least one planetary gear are mounted in the planet carrier, allowing the planet carrier to be directly coupled to the at least one planetary gear and the at least one planetary gear to be directly coupled to the first sun gear and the second sun gear, and the first sun gear and the second sun gear share a same pivot point and are not engaged directly;
a first motor coupled to the first sun gear;
a second motor coupled to the engine;
a first clutch coupled to the second motor;
a second clutch sharing a same pivot point with the first clutch and directly coupled to the planet carrier;
a differential coupled to the second sun gear; and
a battery mounted to the first motor and the second motor for providing supply currents to the first motor or the second motor or receiving additional currents from the second motor,
wherein when the hybrid mechanism is operating in a double motor mode, the battery provides the supply power to the first motor and the second motor, the first motor outputs a first driving force to the hybrid unit, the first driving force is transmitted from the first sun gear to the second sun gear, allowing the second clutch to be coupled and prevented from powering up the engine, the second motor outputs a second driving force to hybrid unit, the second driving force is transmitted from the planet carrier to the planetary gear, the hybrid unit receives and harmonizes the first driving force and the second driving force and outputs a harmonized driving force from the second sun gear to the differential.

9. A hybrid mechanism mode, providing an all electric mode, an electric range extend mode and an engine/motor hybrid mode through a combination of a battery, a first motor, a second motor and an engine, wherein in the all electric mode, the battery provides supplying currents to the first motor to output power and a brake unit is provided to prevent the engine and the second motor from providing power, the battery provides the supplying currents to the first motor, enabling the first motor to output a first driving force to a hybrid unit, and the first driving force is transmitted from a first sun gear of the hybrid unit through a second sun gear of the hybrid unit to a differential.

10. A hybrid mechanism mode, providing an all electric mode, an electric range extend mode and an engine/motor hybrid mode through a combination of a battery, a first motor, a second motor and an engine, wherein in the electric range-extend mode, the engine provides power to the second motor to provide range extend currents to the battery, and the battery provides supplying currents to the first motor to output power and a brake unit locks a gear, to prevent a planet carrier directly coupled with the gear from rotation, a first clutch is coupled to allow the engine to drive the second motor to act as a power generator to provide the range-extend currents to the battery, the battery provides the supplying currents to the first motor, enabling the first motor to output a first driving force to a hybrid unit, and the first driving force is transmitted from a first sun gear of the hybrid unit through a second sun gear of the hybrid unit to a differential.

11. A hybrid mechanism mode, providing an all electric mode, an electric range extend mode and an engine/motor hybrid mode through a combination of a battery, a first motor, a second motor and an engine, wherein in the engine/motor hybrid mode, power of the engine and power of the first motor are combined to output power and the battery provides supplying currents to the first motor, the first motor output a first driving force to a hybrid unit, the first driving force is transmitted from a first sun gear of the hybrid unit to a second sun gear of the hybrid unit, a first clutch is directly coupled with a second clutch, allowing the engine to be enabled to output a second driving force to the hybrid unit, the second driving force is transmitted from a planet carrier of the hybrid unit to a planetary gear of the hybrid unit, the hybrid unit receives and harmonizes the first driving force and the second driving force and outputs a harmonized driving force from the second sun gear of the hybrid unit to a differential.

12. A hybrid mechanism mode, providing an all electric mode, an electric range extend mode, an engine/motor hybrid mode and a double motor mode through a combination of a battery, a first motor, a second motor and an engine, wherein the double motor mode, the battery provides supplying currents to the first motor and the second motor, the first motor outputs a first driving force to a hybrid unit, the first driving force is transmitted from a first sun gear of the hybrid unit to a second sun gear of the hybrid unit, a second clutch is coupled to prevent the engine from being powered, the second motor outputs a second driving force to the hybrid mechanism, the second driving force is transmitted from a planet carrier of the hybrid unit to a planetary gear of the hybrid unit, the hybrid unit receives and harmonizes the first driving force and the second driving force and outputs a harmonized driving force from the second sun gear to a differential.

13. The hybrid mechanism mode of claim 12, wherein the battery, the first motor, the second motor, and the engine provide power that is harmonized by a hybrid unit.

14. The hybrid mechanism mode of claim 13, wherein the hybrid unit comprises a planet carrier, a first sun gear, a second sun gear, and at least one planetary gear, wherein the first sun gear, the second sun gear and the at least one planetary gear are mounted in the planet carrier, the planet carrier is directly coupled to the at least one planetary gear, the at least one planetary gear is directly coupled to the first sun gear and the second sun gear, and the first sun gear and the second sun gear are coupled at a same pivot point and are not engaged directly.

15. The hybrid mechanism mode of claim 14, wherein the first motor is directly coupled to the first sun gear to provide the power to the hybrid unit.

16. The hybrid mechanism mode of claim 14, wherein the second sun gear is coupled to a differential, and the differential receives the harmonized driving force transmitted from the hybrid unit to perform a speed-adjusting process.

17. The hybrid mechanism mode of claim 14, wherein the second motor is directly coupled to the first clutch, and the first clutch is directly coupled to the engine and the second motor in the electric range-extend mode, allowing the engine to drive the second motor to act as a power generator.

18. The hybrid mechanism mode of claim 17, wherein the first clutch shares a same pivot point with the second clutch, and the second clutch is coupled to the planet carrier.

19. A hybrid mechanism, comprising:
   an engine;
   a hybrid unit comprising a planet carrier, a first sun gear, a second sun gear, and at least one planetary gear, wherein the first sun gear, the second sun gear and at least one planetary gear are mounted in the planet carrier, allowing the planet carrier to be coupled to the at least one planetary gear and the at least one planetary gear to be coupled to the first sun gear and the second sun gear, and the first sun gear and the second sun gear share a same pivot point and are not engaged directly;
   a clutch having one end coupled to the engine and the other end coupled to the planet carrier for inputting power to the hybrid unit; and
   a differential coupled to the second sun gear through a pair of gears for transmitting power of the hybrid unit to the differential.

* * * * *